No. 843,946. PATENTED FEB. 12, 1907.
F. J. HOWALD.
FISH PARACHUTE.
APPLICATION FILED NOV. 27, 1906.
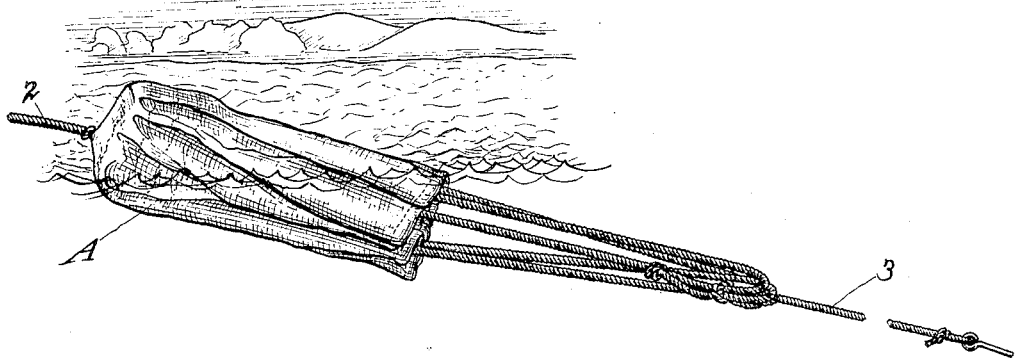
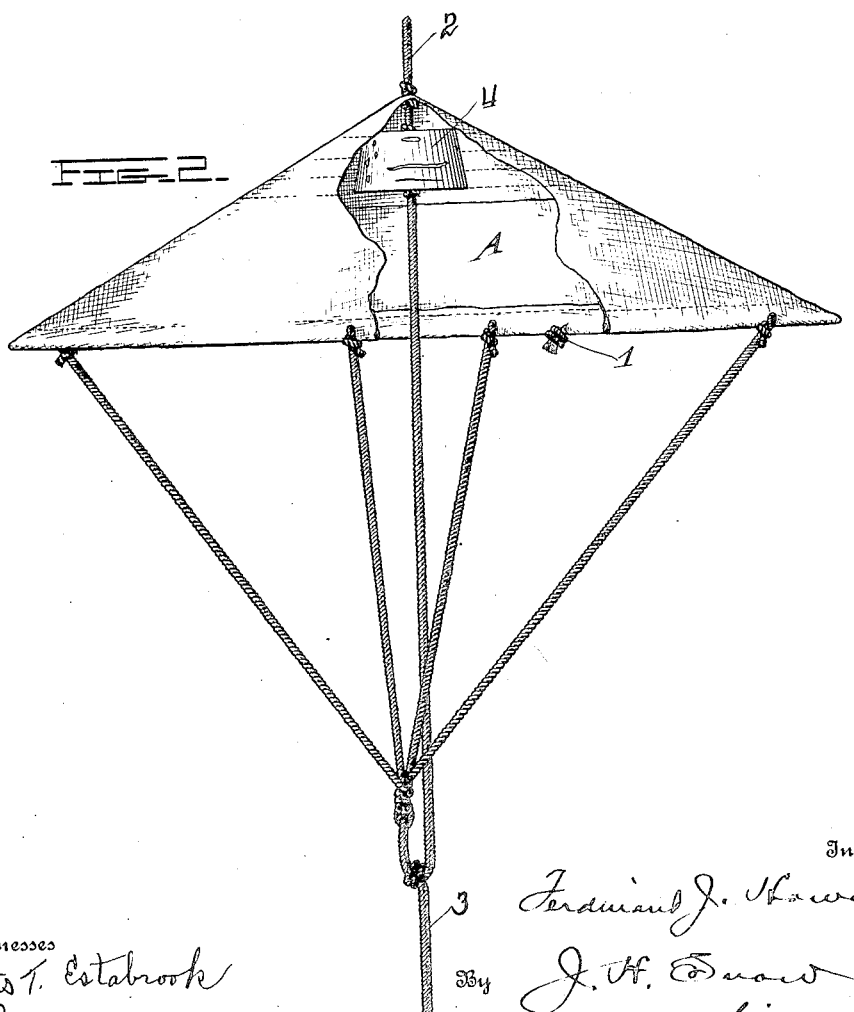
Witnesses
Watts T. Estabrook
Inventor
Ferdinand J. Howald
By J. H. Snow
his Attorney

UNITED STATES PATENT OFFICE.

FERDINAND JACK HOWALD, OF SANTA CRUZ, CALIFORNIA.

FISH-PARACHUTE.

No. 843,946.

Specification of Letters Patent.

Patented Feb. 12, 1907.

Application filed November 27, 1906. Serial No. 345,326.

*To all whom it may concern:*

Be it known that I, FERDINAND JACK HOWALD, a citizen of the United States, residing at Santa Cruz, in the county of Santa Cruz and State of California, have invented certain new and useful Improvements in Fish-Parachutes, of which the following is a specification.

My invention relates to an improvement in fish-parachutes or fish floats and parachutes; and the object is to provide an angling device which, as the name implies, will spread in the water when a fish bites and starts in the opposite direction with the hook, its purpose being to resist the escape of the fish and assist the angler in landing the game.

With the foregoing objects in view my invention consists in certain novel features of construction and combinations of parts, which will be hereinafter described, and pointed out in the claims.

In the accompanying drawings, Figure 1 is a view in perspective of the device. Fig. 2 is a sectional view.

A represents the body of the parachute, which may be constructed of coarse linen or other light fabric. This is made in the form of a cone, preferably reinforced at the center to give it the desired rigidity, and a cord 1 is preferably hemmed in at the outer edge. A line 2 at the top is connected with the fishing rod or pole and a line 3 at the bottom with the hook. Cords extend radially from the line 3 to various points at the outer edge of the parachute to support the latter when it spreads and prevent its turning inside out.

If desired, a cork 4 may be secured on the line 3 just within the apex of the parachute.

In practice the line is thrown in the usual manner and dragged through the water—a sinker being used, if desired—by pulling on the pole or rod. This causes the parachute to close and remain in a closed position. As soon as a fish takes hold of the bait and hook and starts in the opposite direction the parachute opens and retards the speed of the fish, the parachute responding instantly to this resistance, and by reason of it the hook is drawn tighter into the gills of the fish, and as the fish struggles the parachute has the effect of wearing the fish out, and the angler using the line can then easily pull the fish to the boat or ashore without difficulty or the danger usually incident to fishing of the fish freeing himself from the hook. In this way a simple contrivance is provided for adding to the sport of angling, as well as greatly increasing the results by lessening the number of losses usually experienced in fishing, especially by the more inexperienced fisherman.

Slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. As an article of manufacture, a parachute attached to a fishing-line.

2. A parachute attached to a fishing-line and a float located within the parachute.

3. The combination with a fishing-line, of a collapsible parachute of textile fabric secured at its apex to the line and branch devices extending from the line to the edge of the parachute.

In testimony whereof I have signed my name to this specification in the presence of two subscribing witnesses.

FERDINAND JACK HOWALD.

Witnesses:
 THOMAS S. WALKER,
 WM. A. LUCAS.